(No Model.)   2 Sheets—Sheet 1.

I. B. CUSHING.
PROCESS OF AND APPARATUS FOR PURIFYING AND MATURING LIQUORS.

No. 267,779.   Patented Nov. 21, 1882.

WITNESSES

INVENTOR (No Model.)

I. B. CUSHING.

PROCESS OF AND APPARATUS FOR PURIFYING AND MATURING LIQUORS.

No. 267,779. Patented Nov. 21, 1882.

UNITED STATES PATENT OFFICE.

IRA B. CUSHING, OF BROOKLINE, ASSIGNOR TO THE CUSHING PROCESS COMPANY, OF BOSTON, MASSACHUSETTS.

PROCESS OF AND APPARATUS FOR PURIFYING AND MATURING LIQUORS.

SPECIFICATION forming part of Letters Patent No. 267,779, dated November 21, 1882.

Application filed April 14, 1882. (No model.)

*To all whom it may concern:*

Be it known that I, IRA B. CUSHING, a citizen of the United States, residing at Brookline, in the county of Norfolk and State of Massachusetts, have invented certain Improvements in Processes of and Apparatus for Purifying and Maturing Liquors or Distilled Spirits, of which the following is a full, clear, and exact description, reference being had to the accompanying drawings, making part of this specification, in which—

Figure 1:
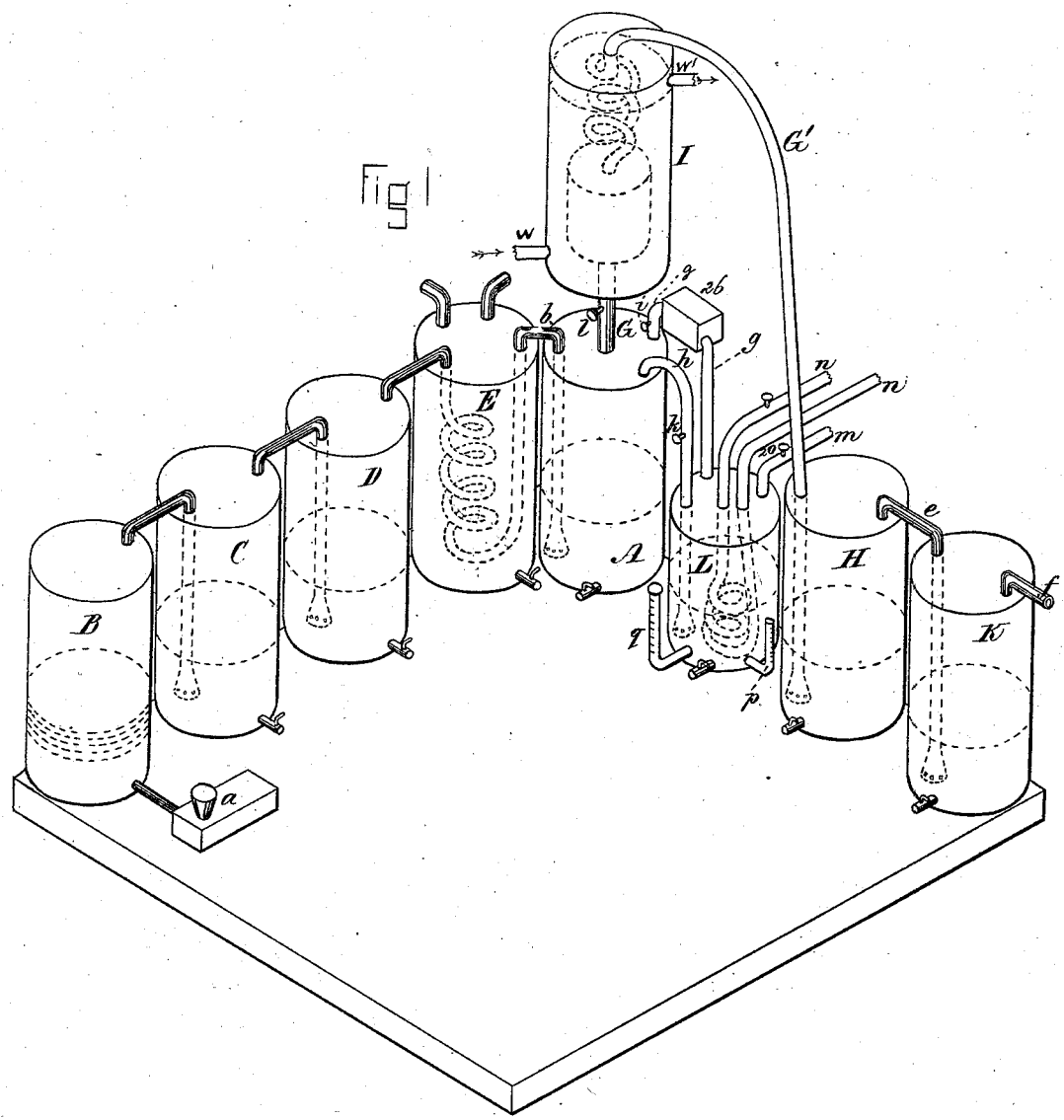
Figure 2:
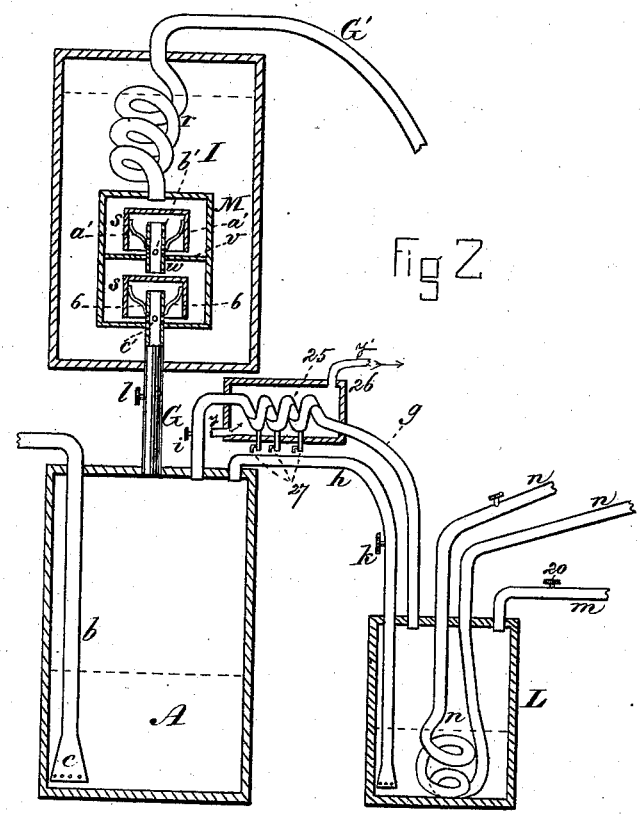

Figure 1 is a perspective view of my improved apparatus. Fig. 2 is a vertical section through a portion of the same.

My invention relates to certain improvements in processes of and apparatus for purifying and maturing liquors, and has for its object to enable me to more quickly and perfectly extract or eliminate from newly-distilled spirits being treated the aldehyde, the presence of which is exceedingly objectionable on account of its offensive odor.

In apparatus for purifying and maturing liquors by means of purified and heated air being disseminated through it, as heretofore constructed, this could not be accomplished in a perfect and complete manner on account of the difficulty of forcing the aldehyde contained in the air and alcoholic vapors through the condenser into a tank, the aldehyde being invariably condensed so rapidly as to cause a large proportion to run back into the tank containing the spirits, with which it again became mixed, and thus, while the volatile oils and other impurities were extracted from the spirits, that which it was most desirable to remove—i. e., the aldehyde—still remained.

My present invention, which is an improvement on the patent issued to Cushing and Osgood, August 30, 1881, No. 246,294, consists in the employment of an auxiliary tank or retort adapted to contain water or other liquid, and connected by suitable pipes with the tank or retort holding the distilled spirits to be treated, suitable valves or stop-cocks being provided, whereby at the commencement of the operation the air and alcoholic vapors charged with the aldehyde are caused to pass directly to the auxiliary tank under the liquid therein, the aldehyde passing up through the water or other liquid in this tank and escaping with the air through a waste-pipe provided for the purpose, while the ethylic alcohol and other valuable elements which may have passed over with the aldehyde are collected in the water or liquid and redistilled by heat applied by means of a steam-pipe or otherwise to the auxiliary tank, the vapors containing the ethylic alcohol, minus the aldehyde, being again returned to the spirit-tank while the spirits therein are being treated, rendering the operation continuous; and the necessity of drawing out the contents of the auxiliary tank and redistilling it in a separate apparatus is thus avoided, while as soon as the aldehyde has been extracted the valve in the pipe through which it has passed to the auxiliary tank is closed and that in the pipe leading to the condenser opened, when the operation is allowed to proceed in the usual manner.

My invention also consists in providing the pipe which conducts the alcoholic vapors back from the auxiliary tank to the spirit-tank with a condenser so constructed and arranged as to separate or extract the water from the alcoholic vapors during their passage to the spirit-tank, and thus prevent the water from becoming mixed with the contents of the latter.

My invention also consists in a condenser of novel construction, whereby the force of the upward current is checked and the heated air or vapor retained for a longer period in contact with the cooling-surfaces, to afford sufficient time for the ethylic alcohol to become condensed and saved, thereby preventing any portion of it from being carried over by the force of the current of air into the next tank, as has heretofore been liable to occur.

In the said drawings, A represents the closed tank or retort for containing the spirits to be treated, and through which is disseminated, by means of a pipe, *b*, provided at its lower end with a perforated enlargement or spreader, *c*, a supply of air, previously purified and heated by being forced by means of a suitable air-pump, *a*, through a series of closed tanks or retorts, B C D E, provided with suitable well-known means for accomplishing this result.

G G' are eduction-pipes leading from the spirit-tank A to another tank, H, these pipes being provided with a condenser, I, for condensing the valuable elements contained in the alcoholic vapors and causing them to flow back into the tank A. This condenser I is supplied near its bottom with an inlet-pipe, w, and an outlet-pipe, w', through which the refrigerating material passes into and from the condenser I. The outlet-pipe w' connects with a suitable reservoir the non-condensible portion of the vapors containing the volatile oils and other impurities passing off through the portion G' of the eduction-pipe to the bottom of the tank H, partially filled with water, after passing through which it is conducted by a pipe, e, to the bottom of another similar tank, K, also partially filled with water, after passing through which the air escapes into the atmosphere by a pipe, f, after having passed through the several tanks mentioned, the spirit which is collected in these tanks H K being afterward recovered, if desired, by redistillation or other well-known processes, for use for mechanical and other purposes for which it may be adapted.

The apparatus thus far described is substantially the same as those heretofore used for the purpose, and forms no part of my present invention, its construction and mode of operation being briefly referred to in order to more clearly illustrate the improvements which form the subject of the present invention, and which will now be particularly described.

L is an auxiliary tank or retort containing water or other suitable liquid, and connected with the upper portion of the spirit-tank A by means of two pipes, g h, the latter extending down to near the bottom of the tank L. These pipes are provided with valves or stop-cocks i k, and the pipe G is also provided with a valve or stop-cock, l, between the tank A and the condenser I.

At the commencement of the operation the valves i l are closed and the cock k opened, when the air forced through the spirits in the tank A, mixed with the alcoholic vapors rising therefrom, and carrying with it the aldehyde, ascends to the upper portion of the tank A, whence it is conducted by the pipe h to the bottom of the tank L, the aldehyde passing with the air up through the water, and escaping into the atmosphere through the waste or discharge pipe m, provided with a valve, 20, while the ethylic alcohol and other valuable elements which have passed over with the aldehyde are absorbed and retained by the water or other liquid in the tank L, and thus prevented from passing off with the air and going to waste. This operation is continued until the aldehyde has been entirely eliminated from the spirits in the tank A, when the valves k and 20 are closed and the valves l i in the pipes G g are opened. The air and alcoholic vapors then pass up into the condenser I, where the valuable elements are saved by the condensation of the vapors, which are thus caused to flow back into the tank A, the non-condensible portion thereof passing off through the portion G' of the eduction-pipe to the tank H in the usual manner. During this operation the ethylic alcohol and other valuable elements contained in the liquid in the auxiliary tank L are acted upon by heat applied thereto in any suitable manner, preferably by means of steam passing through a pipe, n, a portion of which is disposed in the form of a coil located at the bottom of the tank L, the alcoholic vapors, minus the aldehyde, being returned through the pipe g to the spirit-tank A, the cock i having been previously opened; and in this manner the operation of returning the spirits in the tank L to the tank A is carried on simultaneously and continuously with the operation of treating the spirits in the said tank A, and the necessity of drawing out the contents of the tank L and recovering the spirits contained therein by redistillation in a separate apparatus is thus avoided.

The pipe g is provided with a portion, 25, having a series of bends or coils, which are inclosed in a casing or receptacle, 26, containing water, a condenser being thus formed, by the employment of which the water can be separated or extracted from the alcoholic vapors passing over from the tank L to the tank A, the water being subsequently drawn off from the lower portions of the bends or coils 25 by means of suitable cocks, 27, arranged for the purpose. The condenser 26 is supplied with an inlet-pipe, y, which connects with a suitable reservoir, and an outlet-pipe, y', through which is discharged the refrigerating material. The temperature of the water in the condenser is intended to be so regulated that the watery vapors only will be condensed, while the alcoholic vapors will be allowed to pass over into the spirit-tank A, and in this manner the water taken up with the alcoholic vapors from the tank L is prevented from being carried over into and becoming mixed with the spirits in the tank A.

The tank L is provided with a thermometer, p, and a hydrometer, q, for indicating the temperature and percentage of alcohol in the liquid contents of the tank. Within the outer casing of the condenser I, between the coil r and the portion G of the eduction-pipe leading to the tank A, is placed a chamber or receptacle, M, within which are arranged a pair of inverted cups or deflectors, s s. The lower deflector is supported by braces 6, projecting out from the top of the pipe G, which extends a short distance above the bottom of the receptacle M, and a little above the lower deflector is placed a partition, v, through which passes a short pipe, w, over the upper end of which is placed the upper deflector, supported by braces a', and thus as the air and alcoholic vapors rise through the pipe G into the chamber M they first impinge upon the lower deflector, and are compelled to pass down under its lower edge, whence they ascend through the short pipe w, and, coming into contact with the upper deflector, are again forced to descend and pass under its lower edge, thence passing into the upper portion of the receptacle M and to the coil r, the liquid produced by the condensation of the vapors above the partition $v$ entering the pipe $w$ through apertures $b'$, and thence running down onto the bottom of the receptacle M, from which it passes through apertures $c'$ into the pipe G, and is conducted thereby back into the tank A.

Instead of two deflectors, as shown, a single one only, or a series of three or more may be employed as preferred.

A deflector or deflectors arranged as above described serve not only to greatly increase the area of the cooling-surface, thus promoting condensation, but also to intercept and retard the upward current or air and retain the vapors for a longer time in contact with the condensing-surface, thereby preventing the ethylic alcohol from being carried over by the force of the upward current of air into the tank H, as has heretofore been liable to occur, and I am thus enabled to effect a material saving of the valuable or lighter alcoholic elements and render the process more simple and efficient.

What I claim as my invention, and desire to secure by Letters Patent, is—

1. The tank A, provided with a condenser and an exit-pipe, and means, as shown and described, for temporarily shutting off communication between the tank and condenser, in combination with the auxiliary tank L, with its connecting-pipes $g\,h$ and discharge-pipe $m$, provided with suitable valves, and means, as shown, for heating the contents of the tank, whereby the ethylic alcohol and water carried over into the tank L are caused to return to the tank A, substantially as and for the purpose set forth.

2. The process of separating or eliminating the aldehyde from the spirits being treated and returning to the spirit-tank any ethylic alcohol which may have passed off with the aldehyde, the same consisting in first discharging the alcoholic vapors from the spirit-tank into an auxiliary tank containing water or other liquid and allowing the aldehyde to be forced with the air through the liquid and escape into the air through a suitable discharge-aperture, and then applying heat to the liquid contents of the auxiliary tank without removing it therefrom and returning the vapors containing the ethylic alcohol to the spirit-tank while the spirits therein are being treated, substantially as described.

3. In an apparatus for purifying and maturing liquors or distilled spirits, the combination, with the auxiliary tank L and the spirit-tank A, of the connecting or return pipe $g$, provided with a condenser, 25 26, and steam-pipe $n$, all constructed and arranged to operate substantially as and for the purpose set described.

Witness my hand this 11th day of April, A. D. 1882.

IRA B. CUSHING.

In presence of—
P. E. TESCHEMACHER,
W. J. CAMBRIDGE.